Jan. 14, 1969  L. MARSHALL  3,421,610
AUTOMATIC CONTROL OF REFLUX RATE IN A GAS SEPARATION
FRACTIONAL DISTILLATION UNIT
Filed Feb. 28, 1966

INVENTOR
Louis Marshall
BY Marn & Jangarathis
ATTORNEYS

United States Patent Office
3,421,610
Patented Jan. 14, 1969

3,421,610
AUTOMATIC CONTROL OF REFLUX RATE IN A GAS SEPARATION FRACTIONAL DISTILLATION UNIT
Louis Marshall, Great Neck, N.Y., assignor to The Lummus Company, New York, N.Y., a corporation of Delaware
Filed Feb. 28, 1966, Ser. No. 530,521
U.S. Cl. 196—99     8 Claims
Int. Cl. C10g 7/00

ABSTRACT OF THE DISCLOSURE

A control system for a fractionation tower wherein a first analog computing module establishes a first signal proportional to the allowable reflux rate for the feed rate to the tower, a second analog computing module establishes a second signal proportional to the actual concentration of a particular component in the tower overhead less the allowable maximum concentration of the component, a third analog computing module establishes a third signal which is the higher of the second signal and zero, a fourth analog computing module establishes a fourth signal proportional to the sum of the first signal and the integral of the third signal over a period of time and the fourth signal is employed to control the reflux rate to the tower.

---

Figure 1:
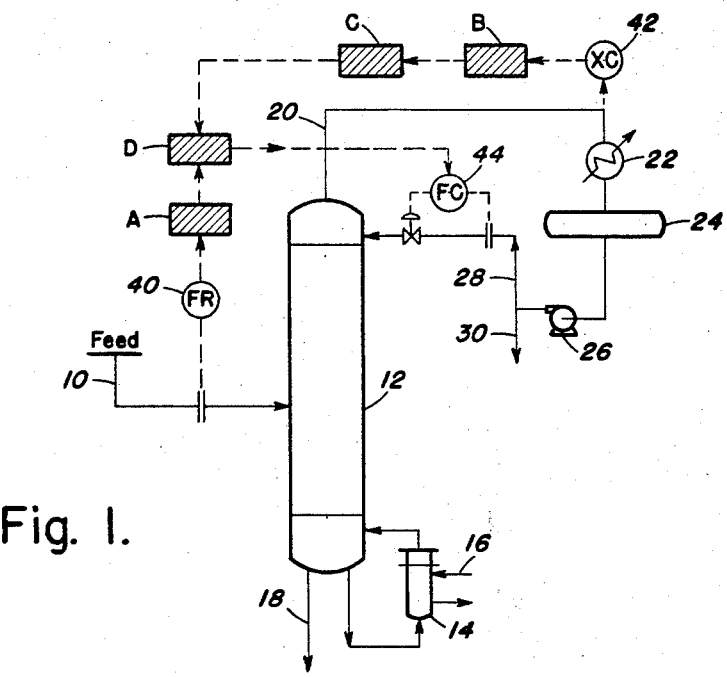

This invention relates generally to an improved method of controlling the fractionation section of a separation plant such as is employed in the oil absorption treatment of natural gas or other gaseous hydrocarbons for the recovery of certain constituents therefrom. More particularly, the invention relates to the use of analog control modules or other computing means to control the reflux rate to a fractionating tower. The invention is applicable to substantially any gas separation system wherein the feed gas composition is subject to only minor variations but the gas flow rate may vary over a broad range, and results in recovery component mixture of predictable compositions. The invention features a novel combination of feedforward and feedback controls, preferably including analog computing modules.

The treatment of hydrocarbon gases for recovery of desired constituents often involves the absorption of said constituents into a suitable lean oil in an absorption tower, which is provided with a plurality of liquid-vapor contacting surfaces, such as packing, bubble trays or the like. The gas is passed countercurrent to the lean oil through this tower, the stripped gas passing overhead and fat oil being recovered as a bottoms product. The desired constituents are recovered from the fat oil in one or more fractionation towers. In these towers, countercurrent contact of liquid and vapor effects a separation of the higher boiling constituents into the bottoms product and the lower boiling constituents into the overhead product. Vapors are generated by heating the lower region of the tower and liquid is obtained by condensing a portion of the overhead and returning it to the tower as reflux.

At some point, the desired constituents are removed from the oil which, again being a lean oil, is recycled to the absorption tower.

The treatment of natural gas serves as a good example of this sort of process, though the invention is not limited thereto. It is often desired to recover separate ethane, propane, butane and gasoline fractions from natural gas, of which the major component is methane. To this end the gas is contacted in an absorption tower with a suitable lean oil which absorbs the desired components. The fat oil is processed through flash stages and a demethanizer where a methane-rich fraction is taken off as vapor and either recycled to the absorber or recovered as a fuel gas product. This methane fraction is a portion of the natural gas which is unavoidably absorbed with the desired components and must be separated therefrom. The liquid bottoms is then passed to a still where the lean oil is recovered as bottoms and recycled to the absorber. An ethane through gasoline fraction is the overhead, and this is then partially condensed and passed to separate fractionation towers for separation of ethane, propane and butane fractions. The bottoms product of the debutanizer is a gasoline fraction which is passed to other processing units.

In such a plant, a very high percentage of the higher boiling constituents is absorbed, and recovery of these components is only slightly affected by the lean oil rate. For lower boiling constituents, however, the percentage of recovery is approximately proportional to the lean oil rate fed to the absorber. When these components are high-value products, therefore, it is desirable to maintain the highest lean oil rate permitted by the equipment design in order to maximize their recovery. For a given plant, this maximum permissible lean oil rate is a variable which depends on the gas feed rate and composition and, according to the operating characteristics of the fractionating towers, is approximately inversely proportional to the feed rate. Thus, it is desirable to take advantage of tower capacity by increasing the lean oil rate when the gas feed rate decreases. On the other hand, it is necessary to decrease the lean oil rate when the gas feed rate increases in order to avoid flooding the tower. Variations in the ratio of lean oil to gas feed result in changes in the relative recoveries of the individual desired constituents. However, when the gas composition is constant and the relationship between the lean oil rate and gas rate is fixed, as by equations which describe a tower capacity limitation, the mixtures of recovered constituents have predictable compositions.

Heretofore, several schemes have been proposed for control of individual fractionating units with the aid of analog or digital computers. In U.S. Patent No. 2,990,437, an analog module utilizes a side-stream analysis to optimize the feed rate to a depropanizer-deisobutanizer column. A feedforward control system for optimizing reflux in distillation columns was described in Chemical Engineering Progress, September 1962, pp. 37–41, and digital control of reboiler heat is described in ISA Transactions, April 1964, pp. 165–174. Analog feedforward control using feed analysis to optimize reflux in a superfractionator was described in Control Engineering, March 1964, pp. 69–74. As noted above, however, in the absorption and separation of natural gas and the like composition of the feed is not subject to broad variation (as is the case in many petroleum separations) but the gas feed rate is. There is thus a need for a simple and effective automatic control system which can adjust the operation of the fractionating section towers in accordance with variations in the quantity and composition of recovered constituents, and it is a general object of this invention to provide such a system.

A further object of the present invention is to provide an automatic control system for fractionation towers which will optimize the tower reflux rate for any given feed rate.

Yet another object of the present invention is to provide an automatic control system for fractionation towers which will maintain the tower product within specified limits while at the same time minimizing consumption of utilities.

Still another object of the present invention is to provide an automatic control system for fractionation towers which increases tower capacity by reducing required safety margins.

Various other objects and advantages of the invention will become clear from the following discussion of two embodiments thereof, and the novel features will be particularly pointed out in connection with the appended claims.

In the operation of most fractionation towers it is desirable to control the rate of reflux to the lowest value consonant with making the desired separation. With liquid tower feeds the reflux rate is effected by a variety of factors, including feed composition, feed rate, overhead and side stream compositions and so forth. In the separation of mixtures obtained from a feed of relatively constant composition, however, not as many factors are involved, and it is possible to devise a control system which depends only on the feed rate and the concentration of a particular constituent in the overhead.

In essence, for towers where the feed rate can be measured entirely as a liquid or a vapor feed the control system of the present invention comprises, firstly, a flow recorder which generates a signal proportional to the flow rate of the feed to the tower. This signal is passed to a calculator, preferably an analog module, which calculates the proper reflux rate for that rate of feed, the feed composition being considered either constant or predictable as a function of feed rate. A concentration recorder generates a second signal proportional to the concentration of the contaminating constituents in the tower overhead. This recorder works in conjunction with a suitable on stream analyzer. The second signal goes to a calculator which subtracts the maximum acceptable level of the contaminating constituent from the measured level and generates a third signal proportional to the difference between the two. This third signal is then compared with zero and the higher value is selected. In other words, a positive signal will be generated by these two control functions only when the concentration of the contaminating constituent exceeds the maximum desired for the particular product fraction. A third calculator takes this last signal, integrates it with time and adds it to the first calculated signal. The output of the third calculator controls the set point of a flow controller in the reflux line. Thus, the reflux rate will be increased when the overhead stream has a higher concentration of the contaminating constituent than is required until this concentration is equal to or below the desired concentration. The reflux rate is in this manner subjected to a feedforward control from the feed flow rate and a feedback control from overhead composition, and is always that rate which provides a net overhead of the desired or better composition.

In the situation where the feed to a tower is of mixed gaseous and liquid phases with differing proportions, a modified calculation of the reflux rate as a function of feed rate must be made, taking into account the relationship between the proportions of gas and liquid rates and the predictable composition of the combined feeds.

It is to be emphasized that the flow recorders, concentration analyzers and recorders and computing devices required for use with the invention are all of well known design and do not, individually, form any part of the present invention. Standard modules capable of performing the computing functions described herein are manufactured by the Devar-Knetics Division of Consolidated Electrodynamics Co. (see Bulletin PL-671-A, March 1965). Further, it should be noted that while particular equations will be set forth for particular control functions, other equations carrying out the same general function but with a greater or lesser degree of accuracy are known and may be used instead of the listed equations. Lastly, the constants listed in any particular function are of course set for a particular fractionating section tower and a particular feed gas to the absorber of the separating plant.

Figure 2:
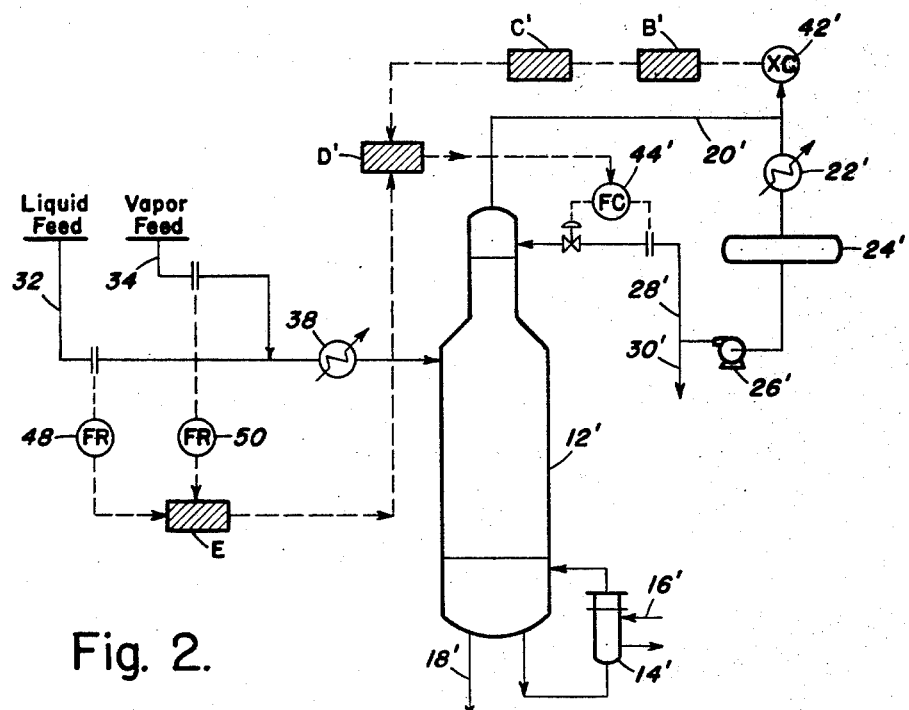

A better understanding of the invention will be gained by referring to the following detailed description thereof, taken in conjunction with the accompanying drawings, wherein:

FIGURE 1 is a schematic flowsheet showing a typical depropanizer or debutanizer column with the control system of the invention; and FIGURE 2 is a schematic flowsheet showing a typical deethanizer column having both liquid and vapor feeds, and having a modified version of the control system of the invention.

The processing units and lines as shown in both drawings are simple and entirely conventional. Thus, in FIGURE 1 a vapor feed line 10 passes the feedstock to an intermediate level of tower 12. Tower 12 is equipped with a reboiler 14 supplied by steam in line 16 and a net bottoms draw-off line 18. Overhead is removed in line 20, passes through condenser 22 and into knockout drum 24. Reflux pump 26 supplies necessary pressure to both reflux line 28 and net overhead line 30.

The operation of the tower of FIGURE 2, typically a deethanizer in a natural gas absorption train, is essentially similar to the tower of FIGURE 1, with the exception that feed thereto, being a partially condensed overhead from the still zone where lean oil is recovered, is part liquid and part vapor. Thus, liquid feed in line 32 and vapor feed in line 34 are combined. The combined feed is passed through a heat exchanger 38 prior to charging to tower 12'. Reflux and reboiler units are essentially the same as set forth in connection with FIGURE 1 and similar parts are indicated with prime numerals.

The control system of the invention, as applied to the tower of FIGURE 1, comprises a flow recorder 40 in feed line 10, a composition recorder 42 in overhead line 20, flow controller 44 in line 28 and four analog modules identified as A, B, C and D. It will be understood, of course, that other conventional controls are employed. For example, a temperature controller between tower 12 and line 16, and a level controller between tower 12 and line 18 would be common expedients.

Module A receives a signal F representative of the feed rate from flow recorder 40. It calculates the reflux rate as a function of feed rate according ot the following expression:

$$L_{R_1} = K_1 F - K_2 F^2 \qquad (I)$$

wherein $L_{R_1}$, is the reflux rate, F is the feed flow rate and $K_1$ and $K_2$ are constants. This reflux rate is the feedforward control aspect of the invention.

Module B receives a signal X representative of the concentration of a particular component in the overhead stream from composition recorder 42. Thus, if tower 12 is a debutanizer the composition in question will be the $C_5$ content of the overhead. If the tower is a depropanizer, X will represent the $C_4$ content, and so forth (i.e., if the desired tower overhead is mainly $C_n$, composition recorder 42 monitors the concentration of $C_n + 1$), wherein $n$ is an integer and C is the carbon atoms of the hydrocarbon. Module B calculates the difference between the analyzed content of the desired component and a maximum acceptable value according to the following expression:

$$\Delta X = X - X_{\max.} \qquad (II)$$

Module C is a comparator which compares $\Delta X$ with zero and selects the higher value. This avoids the use of negative values of $\Delta X$, which would exist whenever concentration of the desired constituents was less than maximum. Modules B and C provide the feedback control aspect of the invention.

Module D receives signal $L_{R_1}$ from module A and, $\Delta X$ or zero from module C, and calculates an adjusted reflux rate according to the following expression:

$$L = L_{R_1} + K \int \Delta X \, dt \qquad (III)$$

wherein L is adjusted reflux rate, K is a constant and $t$ is time. The object of this calculation is to raise the reflux rate until ΔX becomes zero, i.e., the concentration of the desired constituent in the overhead is equal to the maximum acceptable value. Obviously, when the concentration is lower than the maximum the signal will be zero and there will be no correction, the reflux rate then being a function only of the feed rate. The output of module D adjusts the set-point on flow controller 44 in line 28.

Thus, both feedforward and feedback controls are employed to set the tower reflux rate at the proper level. As the feed composition is not subject to significant variation, only the flow rate of the feed and the composition of the desired overhead constituent are necessary for the calculation.

In the embodiment of the invention illustrated in FIGURE 2 the situation is somewhat different. In a typical natural gas absorption train the percentage ethane recovery will vary with the ratio of lean oil rate to gas rate used, while the percentage recovery of propane and heavier remains substantially constant. The composition of the deethanizer feed will therefore vary somewhat, but in a predictable manner. As a result, the split between liquid and vapor fractions in the overhead product stream from the still (which precedes the deethanizer) gives an indication of overall composition, since at a given temperature and pressure the percentages of vapor and liquid in equilibrium are unique functions of total composition.

Accordingly, in the treatment of such a stream, separate flow recorders 48 and 50 are used to monitor the flow of liquid and vapor feed rates, respectively. These recorders produce signals $F_1$ and $F_2$, representative of the liquid and vapor feed rates, respectively, which are the inputs to module E. This analog module calculates the allowable reflux rate $L_{R_1}$ for the tower (12′) as a function of these rates according to the following expression:

$$L_{R_1} = (F_1 + F_2)\left[K_1 + K_2 \frac{(F_1)}{(F_2)} + K_3 \frac{(F_2)^2}{(F_1)}\right] \quad \text{(IV)}$$

The constants $K_1$, $K_2$ and $K_3$ in this expression are selected so as to reflect the characteristics of the fractionating tower as they are affected by the feed composition and quantity.

The output of module E is a signal comparable to the output of module A in the embodiment of FIGURE 1. Modules B′, C′ and D′, furthermore, perform exactly the same functions as disclosed in connection with FIGURE 1, with the obvious exception that in this instance concentration recorder 42′ is concerned with the $C_3$ content of the overhead stream.

The net effect of either embodiment of the invention is to prevent the concentration of the next-higher hydrocarbon in the overhead from exceeding a certain maximum while at the same time providing the proper reflux rate for the tower at the existing feed rate. Without such controls, it is necessary to have a wider margin of safety in the tower operation, which means operation at a higher reflux rate than is necessary, with a consequent decrease in maximum throughput of product and increase in consumption of utilities (i.e., due to the higher load on overhead condenser, reboiler, etc.).

Various changes in the details, steps, materials and arrangements of parts, which have been herein described and illustrated in order to explain the nature of the invention, may be made by those skilled in the art within the principle and scope of the invention as defined in the appended claims. In the claims, the various signals have been numbered serially for purposes of clarity and ease of understanding, but it will be understood that there is no sequential relation between the various signals as might otherwise be implied.

I claim:

1. In a fractionating tower having a feed line, a bottoms reboiler and an overhead line, including a reflux line for recycling condensed overhead to the tower, a control system comprising:

first means operatively connected to the feed line, said first means being responsive to the feed rate to produce a first signal proportional to the allowable reflux rate for the feed rate;

second means operatively connected to the overhead line, said second means being responsive to the concentration of a particular overhead constituent to produce a second signal proportional to the actual concentration of the particular overhead constituent less the allowable maximum concentration of said constituent;

third means operatively connected to the second means to compare the second signal and zero to produce a third signal which is the higher of said second signal and zero;

fourth means operatively connected to the first means and third means to receive said first and third signals, said fourth means calculating the sum of said first signal and the integral of said third signal with time to produce a fourth signal proportional thereto; and fifth means operatively connected to the reflux line for controlling the reflux rate to the tower, said fifth means being operatively connected to the fourth means to receive the fourth signal and control the reflux rate in response thereto.

2. The control system as claimed in claim 1, wherein said tower overhead is substantially $C_n$ and said particular overheat constituent is $C_{n+1}$, wherein C is the carbon atoms of a hydrocarbon and $n$ is an integer.

3. The control system as claimed in claim 1, wherein said feed line includes separate vapor and liquid feed lines, and the first means to establish said first signal comprises:

a first flow recording means operatively connected to the liquid feed line to produce a fifth signal proportional to the liquid flow rate;

a second flow recording means operatively connected to the vapor feed line to produce a sixth signal proportional to the vapor flow rate; and an analog computing means operatively connected to the first and second flow recording means to receive the fifth and sixth signals, said analog computing means producing the first signal which is proportional to the allowable reflux rate for the vapor and liquid feed.

4. The control system as claimed in claim 1, wherein the first means to produce said first signal comprises flow recording means in said feed line and an analog computing module operatively connected to the flow recording means.

5. The control system as claimed in claim 1, wherein the fourth means to produce said fourth signal comprises an analog computing module having said first and third signals as inputs, and wherein the fifth means comprises a valve means in the reflux line, a flow controller means sensing the flow rate in the reflux line and operatively connected to the valve means, the set point of the flow controller means being set by the fourth signal, whereby the flow controller means opens and closes the valve means to maintain the set reflux rate.

6. The control system as claimed in claim 2, wherein the second means comprises:

an analyzer means measuring the concentration of $C_{n+1}$ in said overhead line and producing a seventh signal proportional thereto; and a calculator means operatively connected to the analyzer means to receive the seventh signal, said calculation means subtracting the maximum allowable concentration of $C_{n+1}$ from said seventh signal to produce said second signal.

7. In a hydrocarbon fractionating tower designed to remove a hydrocarbon fraction $C_n$ from a gaseous hydrocarbon mixture wherein C is the carbon atoms of the hydrocarbon and $n$ is an integer and having feed, overhead and bottoms lines, reflux of condensed overhead and a bottoms reboiler, a control system comprising:

flow recording means operatively connected to the feed line to produce a signal F proportional to the gas flow rate;

first analog computing means operatively connected to the flow recording means to receive the signal F, said first analog computing means calculating the allowable reflux rate as a function of F and producing a signal $L_{R_1}$ proportional thereto;

analyzer means operatively connected to the overhead line to analyze the concentration of $C_{n+1}$ in said overhead stream and produce a signal X proportional thereto;

second analog computing means operatively connected to the analyzer means to receive the signal X, said second analog computing means subtracting the allowable concentration of $C_{n+1}$ in said overhead from X and producing a signal $\Delta X$ proportional thereto;

third analog computing means operatively connected to the second computing means to receive the signal $\Delta X$, said third computing means comparing $\Delta X$ with zero and producing a signal A representative of the higher value;

fourth analog computing means operatively connected to the third computing means to receive the signal A and to the first computing means to receive the signal $L_{R_1}$, said fourth computing means integrating said signal A with time and adding $L_{R_1}$ thereto to produce a signal $L_R$ proportional to the sum thereof; and control means operatively connected to the reflux line to control the reflux rate, said control means being operatively connected to the fourth computing means to receive the signal $L_R$ and control the reflux rate in response to signal $L_R$.

8. In a hydrocarbon fractionating tower designed to remove a hydrocarbon fraction $C_n$ from a mixed phase feed provided in separate liquid and vapor feed lines and having overhead and bottoms lines, reflux of condensed overhead and a bottoms reboiler, wherein C represents the carbon atoms in the hydrocarbon and $n$ is an integer, a control system comprising:

first flow recording means operatively connected to the vapor feed line to produce a signal $F_1$ proportional to the vapor flow rate;

second flow recording means operatively connected to the liquid feed line to produce a signal $F_2$ proportional to the liquid flow rate;

first analog computing means operatively connected to the first and second flow recording means to receive signals $F_1$ and $F_2$, said first computing means calculating the allowable reflux rate as a function of $F_1$ and $F_2$ and producing a signal $L_{R_1}$ proportional thereto;

analyzer means operatively connected to the overhead line to analyze the concentration of $C_{n+1}$ in said overhead stream and produce a signal X proportional thereto;

second analog computing means operatively connected to the analyzer means to receive the signal X, said second analog computing means subtracting the allowable concentration of $C_{n+1}$ in said overhead from X and producing a signal $\Delta X$ proportional thereto;

third analog computing means operatively connected to the second computing means to receive the signal $\Delta X$, said third computing means comparing $\Delta X$ with zero and producing a signal A representative of the higher value;

fourth analog computing means operatively connected to the third computing means to receive the signal A and to the first computing means to receive the signal $L_{R_1}$, said fourth computing means integrating said signal A with time and adding $L_{R_1}$ thereto to produce a signal $L_R$ proportional to the sum thereof; and control means operatively connected to the reflux line to control the reflux rate, said control means being operatively connected to the fourth computing means to receive the signal $L_R$ and control the reflux rate in response to signal $L_R$.

References Cited

UNITED STATES PATENTS

| | | | |
|---|---|---|---|
| 2,985,565 | 5/1961 | Bellinger | 202—160 |
| 2,990,437 | 6/1961 | Berger | 202—160 |
| 3,020,213 | 2/1962 | Lupfer | 235—151.12 |
| 3,197,138 | 7/1965 | Lupfer | 208—341 |
| 3,212,997 | 10/1965 | Walker | 202—160 |
| 3,224,210 | 12/1965 | Albritton | 62—28 |
| 3,227,631 | 1/1966 | Stine | 202—206 |
| 3,237,376 | 3/1966 | Bauer | 196—132 |
| 3,309,287 | 3/1967 | Lupfer et al. | 203—1 |
| 3,342,702 | 9/1967 | Rijnsdorp | 203—1 |

WILBUR L. BASCOMB, JR., *Primary Examiner.*

U.S. Cl. X.R.

196—132, 135; 203—1, 2, 3, 99; 202—160; 208—341; 62—37; 235—151.12